US012795187B2

United States Patent
(12) United States Patent
Waller et al.

(10) Patent No.: US 12,795,187 B2
(45) Date of Patent: Nov. 10, 2026

(54) CONTENT CATEGORIZATION MANAGER

(71) Applicant: ARRIS Enterprises LLC, Horsham, PA (US)

(72) Inventors: Brian D. Waller, Hillsborough, NJ (US); Brajesh Arora, Cupertino, CA (US); Anurag Arora, Bengaluru (IN); Manivannan Lalgudi Kannan, Bengaluru (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 18/783,261

(22) Filed: Jul. 24, 2024

(65) Prior Publication Data

US 2025/0039486 A1 Jan. 30, 2025

Related U.S. Application Data

(60) Provisional application No. 63/528,604, filed on Jul. 24, 2023.

(51) Int. Cl.

| | |
|---|---|
| ***H04N 21/231*** | (2011.01) |
| ***H04N 21/234*** | (2011.01) |
| ***H04N 21/258*** | (2011.01) |
| ***H04N 21/266*** | (2011.01) |
| ***H04N 21/433*** | (2011.01) |
| ***H04N 21/458*** | (2011.01) |
| ***H04N 21/472*** | (2011.01) |

(52) U.S. Cl.

CPC ......... *H04N 21/266* (2013.01); *H04N 21/234* (2013.01); *H04N 21/47202* (2013.01)

(58) Field of Classification Search

None

See application file for complete search history.

(56) References Cited

U.S. PATENT DOCUMENTS

| | | | | |
|---|---|---|---|---|
| 8,924,510 | B1 * | 12/2014 | Preston | G06F 16/435 709/248 |
| 2008/0133111 | A1 * | 6/2008 | Buslepp | F02D 41/1498 123/334 |
| 2008/0133311 | A1 * | 6/2008 | Madriz Ottolina | G06Q 30/0273 705/14.69 |
| 2012/0310941 | A1 * | 12/2012 | MacDonald | G06F 16/958 707/E17.09 |

* cited by examiner

*Primary Examiner* — Brian T Pendleton
*Assistant Examiner* — Jean D Saint Cyr
(74) *Attorney, Agent, or Firm* — Chernoff, Vilhauer, McClung & Stenzel, LLP

(57) ABSTRACT

The described system allows for dynamic curating of video storefront categories and content using a novel Content Categorization Manager ("CCM") which among other things, allows an operator to create criteria for a category that defines what content should and should not be associated to a Criteria Based Category ("CBC"). The CCM will periodically use the criteria to calculate what content should be associated to the Target Category. Once this calculation is complete, the category definition and relevant associations will be pushed out to the storefront in accordance with the rules of that storefront.

13 Claims, 7 Drawing Sheets

| Title | License Start | License End | Viewer Score | Meets Category Criteria |
|---|---|---|---|---|
| Movie 1 | 01/01/2020 | 12/31/2023 | 8.0 | Yes |
| Movie 2 | 02/01/2023 | 12/31/2023 | 7.9 | Yes |
| Movie 3 | 03/01/2023 | 12/31/2027 | 7.5 | No |
| Movie 4 | 03/01/2023 | 12/31/2027 | 7.4 | No |
| Movie 10 | 02/01/2023 | 12/31/2023 | 5.0 | No |
| Movie 11 | 02/01/2023 | 12/31/2023 | 5.0 | No |

Table 1
Current date February 02, 2023

*FIG. 7A*

| Title | License Start | License End | Viewer Score | Meets Category Criteria |
|---|---|---|---|---|
| Movie 1 | 01/01/2020 | 12/31/2023 | 8.0 | Yes |
| Movie 2 | 02/01/2023 | 12/31/2023 | 7.9 | Yes |
| Movie 3 | 03/01/2023 | 12/31/2027 | 7.5 | Yes |
| Movie 4 | 03/01/2023 | 12/31/2027 | 7.4 | No |
| Movie 10 | 02/01/2023 | 12/31/2023 | 5.0 | No |
| Movie 11 | 02/01/2023 | 12/31/2023 | 5.0 | No |

Table 2
Current date March 01, 2023

*FIG. 7B*

| Title | License Start | License End | Viewer Score | Meets Category Criteria |
|---|---|---|---|---|
| Movie 1 | 01/01/2020 | 12/31/2023 | 8.0 | Yes |
| Movie 2 | 02/01/2023 | 12/31/2023 | 7.9 | Yes |
| Movie 3 | 03/01/2023 | 12/31/2027 | 7.3 | No |
| Movie 4 | 03/01/2023 | 12/31/2027 | 7.5 | Yes |
| Movie 10 | 02/01/2023 | 12/31/2023 | 5.0 | No |
| Movie 11 | 02/01/2023 | 12/31/2023 | 5.0 | No |

Table 3
Current date March 02, 2023

*FIG. 7C*

CONTENT CATEGORIZATION MANAGER

CROSS-REFERENCE TO RELATED APPLICATIONS

The present application claims priority to U.S. Provisional Application No. 63/528,604 filed Jul. 24, 2023, the content of which is incorporated herein by reference in its entirety.

TECHNICAL FIELD

This application relates to a Content Categorization Manager (CCM) system for optimizing an electronic video storefront.

BACKGROUND

A traditional cable television production and distribution system typically comprises a content provider which provides a cable TV distributor with video programming for the cable TV distributor to distribute to viewers through a cable network. The content provider may be the party responsible for creating and/or producing one or more videos or it may be the party who distributes such one or more videos.

The content provider typically provides the video programming to the cable TV distributor via a satellite link and/or a high-speed broadband network system, such as, for example, the Internet. In other cases, the content provider provides the video programming to the cable TV distributor on a recording media (e.g., digital video disc, hard drive). The cable TV distributor provides the viewers with video programming via the cable network. The cable network may be composed of, for example, coaxial and/or fiber-optic cabling. Video programming is distributed to viewers in either an analog or digital (MPEG) format via the cable network. The video programming is received by a consumer premise device associated with the viewer who is capable of receiving the analog or the digital signal and displaying video programming represented by the signal(s) on an associated display device. The customer premise equipment may be, for example, a television, a set top box, or otherwise. The typical cable TV distributor includes media storage server for storing programming content received from the content provider for a predetermined time, typically until it is distributed to viewers via the cable network. The media storage server may be for example, one or more hard-disk drive-based storage servers on which the video programming may be recorded.

A customer device is often capable of bi-directional communication with a head end of the cable TV distributor via the cable network or via other networks. Aside from converting the video programming signal received from the cable TV distributor into a signal that can be displayed on an associated display device, the customer device also provides a viewer with the ability to provide input to, for example, to control the selection of video programming available from the cable TV distributor via one or more channels over which the cable TV distributor will distribute video programming for display/viewing by a customer.

Currently customer devices associated with cable networks can generate and/or display a programming guide allowing an operator to select video content. These can be generally referred to as an electronic programming guide and can take the form of a grid pattern of times and channels, e.g., what is currently viewed with cable television.

Customers with an Internet connection may also access video content that is provided by the cable television distributor or other video content delivery services directly through an Internet based content delivery video service, whereby the video content delivery service can organize the content in some way, usually graphically.

The foregoing and other objectives, features, and advantages of the invention may be more readily understood upon consideration of the following detailed description of the invention taken in conjunction with the accompanying drawings.

BRIEF DESCRIPTION OF THE DRAWINGS

FIGS. 7A, 7B, and 7C show data tables as they are referenced in the method of FIG. 6.

Like reference numbers and designations in the various drawings indicate like elements.

DETAILED DESCRIPTION

Many customer devices associated with a cable network are configured to generate and/or display a programming guide from which to select video content. Some programming guides are generally referred to an electronic programming guide in the form of a grid pattern of times and channels, such as what is traditionally provided with cable television. These programming guides are static in nature and are generally updated in batch and remain unchanged except in scheduled updates of the entire guide.

In other embodiments, customers with an Internet connection may access video content that is provided by the cable television distributor or other video content delivery services directly through an Internet based content delivery video service, such as for example, www.hulu.com, www.abc.com, www.netflix.com, and www.historychannel.com. In this case, typically the video content delivery service organizes the content in some manner, such as using a graphical interface, for example, configured as a storefront setup which is commonly designed to look like apps, tiles, or icons indicative of the content provider. The video content is selectable by the customer to be viewed, normally on-demand.

However, not all storefronts support this type of dynamic category placement and may require service providers to manually assign content to categories to assist with the organization and placement. In situations where the service provider must manually assign content to categories, it can be a time-consuming process that limits the number of categories that can be curated as well as taking away time from other activities.

Figure 1:
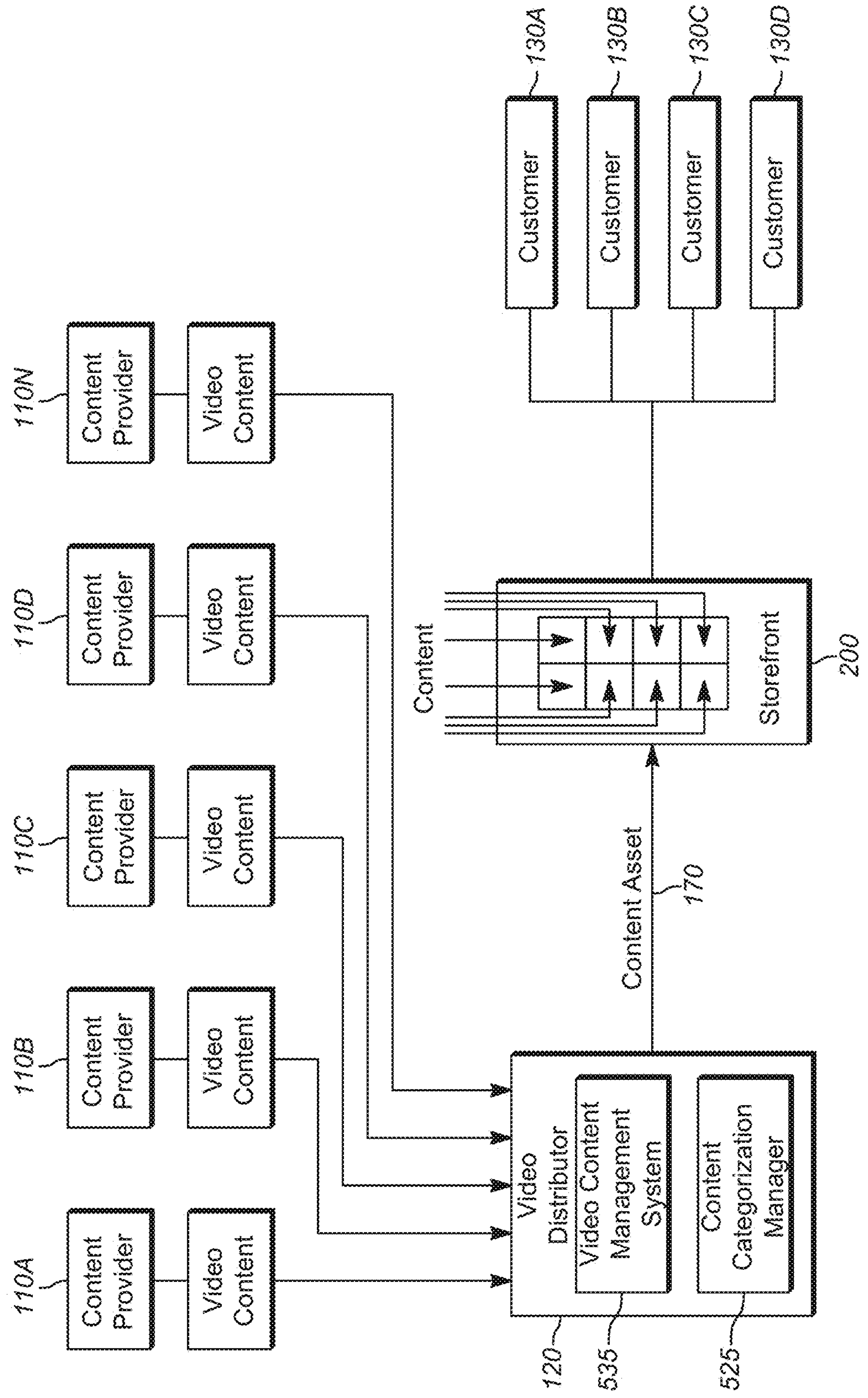
FIG. 1 illustrates a video distribution system with a video content management system.
Figure 2:
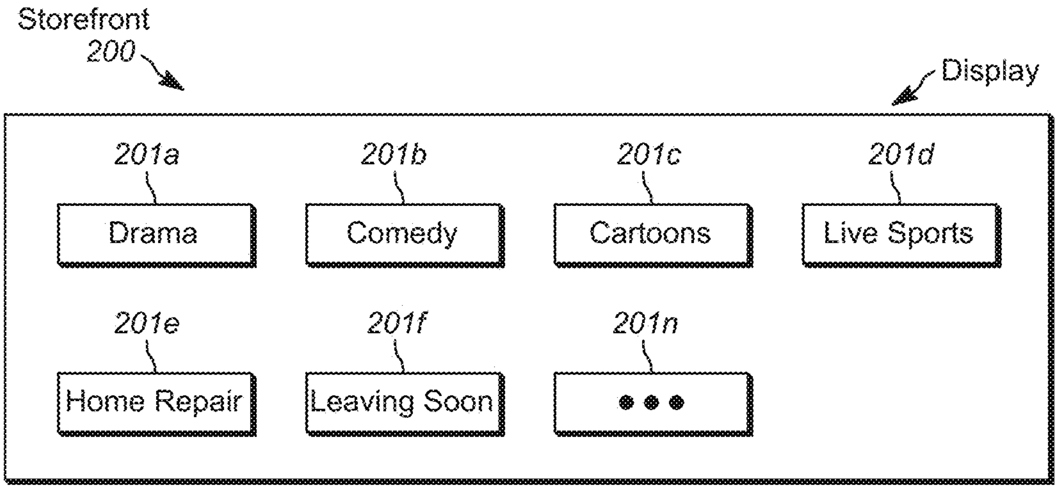
FIG. 2 shows an example storefront as referred to herein.

When integrated, as illustrated in FIG. 1, a video distribution system receives content from multiple content providers 110A, 110B, 110C, 110D . . . 110N, all of which are providing video content to a video distributor 120. The video content may be provided in any suitable manner, such as across a network or by a physical medium. The video distributor 120 then provides the video content on demand or to a storefront 200 which in turn provides the video content on demand, to one or more customers 130A, 130B, 130C . . . 130N, through a communication network such as the Internet or a cable network. An example storefront 200 is shown in FIG. 2. Returning to FIG. 1, each of the content providers 110 provides video content to the video distributor 120 which is received by a video content management system 535 (not shown) and a content categorization manager 525. The Video Content Manager (VCM) Catalog is populated with content assets and categories. Each asset (Content Asset) has metadata associated to it comprising information such as a license window, genres, actors, metadata from one or more third-party enrichment sources. These Content Assets can have associations to categories; however, such an association is not required. Content-based Category ("CBC") Rules may refer to existing categories or new categories. (not shown in FIG. 1))

The video content may be provided in the form of a Content Asset 170, where the Content Asset includes a video file inclusive of a video file (and a separate audio file if the audio file is not embedded in the video file) embedded therein 171 (not shown), and/or a metadata file 172 (not shown) that describes characteristics of the video file and its intended subsequent processing so that the video file is suitable for the intended customers 130. The processed video content is then made available to a storefront 200, such as a video on demand service, for the intended customers 130. In some cases, the video on demand service is a transactional video on demand system and in other cases the video on demand service is a subscription video on demand system.

As disclosed herein, a novel Content Categorization Manager ("CCM") system solves the problems described previously by allowing operators to create criteria for a category by controlling what content should and should not be associated to a criteria-based category ("CBC"). Once this calculation is complete, the category definition and relevant associations will be pushed out to the storefront in accordance with the rules of that storefront. In turn, video content criteria, for example, a title, can be uploaded to the database. The metadata and the criteria will be used to automatically sort or put that video content title into its proper bin or category. Accordingly, when a viewer watches content via, for example, a popular video streaming service, and some criteria about the content is specified, for example, that it is a new release, or a drama, or something popular at the time. The criteria are such that the CCM system can perform updates automatically without the operator having to manually put it into those categories using the metadata pitched with the content. Thus, in these cases, the content provider will pitch the package, and, in the metadata, there can be various criteria, for example, information about content licensing.

In an embodiment using the Content Categorization Manager ("CCM"), an operator is permitted to create criteria for a category that defines what content should and should not be associated to a criteria-based category ("CBC"). Not only does this allow for more categories, it allows for personalization of some categories because the operator can control not only the categories themselves but further control how the contents for the categories can be described. The rate or types of updating the categories can also be defined or controlled. The following are some example types of information that can be used when defining the criteria and for defining a CBC rule:

Target Category: The name of the category of focus.

Content Criteria: Criteria used to define what content are candidates to be associated to the category. This can include both positive and negative criteria. The Content Criteria can be based on any metadata available in the catalog and can be based on but not limited to a license window, genres, actors, metadata from third party enrichment sources.

Sort Criteria: Sorting criteria that along with Maximum Number can help determine which content gets associated to the category.

Maximum Number: Maximum number of in-license contents to include in the target category.

Minimum Number: a measure of content that can be defined as "If in-license matched content is less than this number hide the target category."

Must Include Content List: A list of content the service provider explicitly wants to include regardless of the Content Criteria.

Block List: A list of content the service provider explicitly wants to exclude from the category even if it matches the Content Criteria.

Criteria based category ("CBC") rules may refer to existing categories or new categories. The CCM allows for the recalculation of the CBC rules to continuously over time optimize what is sent to or accessible from the storefront. Although a service provider predefines the criteria-based category ("CBC") rules, the criteria can be updated and cause a refresh or recalculation.

The CCM 525 will periodically use the criteria to calculate what content should be associated to the Target Category. Once the calculation is complete the category definition and relevant associations will be pushed out to the storefront 200 in accordance with the rules of that storefront.

Figure 3:
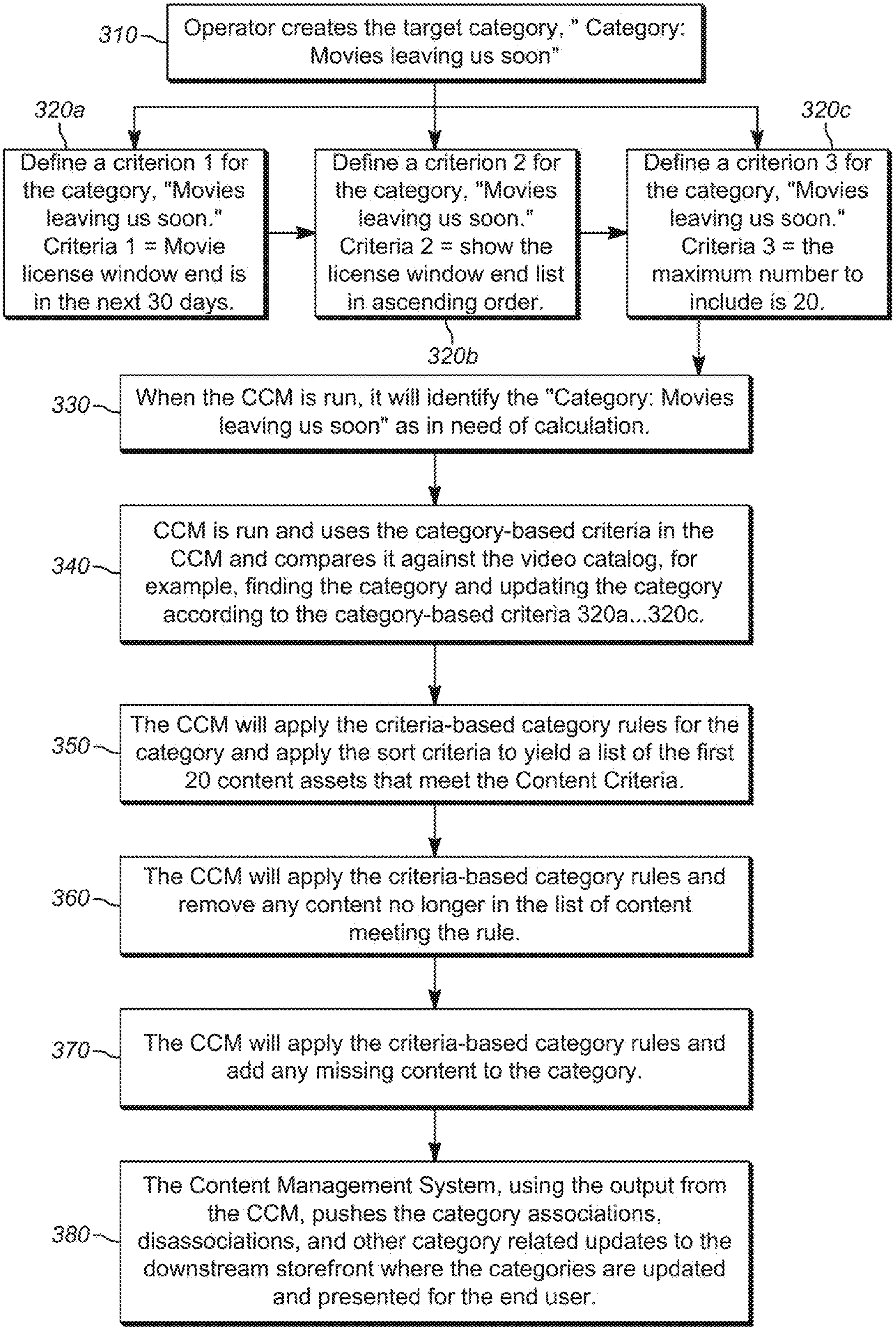
FIG. 3 is an example of a CCM flow.

An example use case 300 of the above-mentioned process flow is shown in FIG. 3. Firstly, at 310 an operator creates a target category. Here, for example, at 310, the operator creates the target category, "Category: Movies Leaving Us Soon." This category can comprise titles for content that might be soon out of the license period or other reasons why the title will be unavailable to an end user at some point in the near future.

Next, the operator defines one or more criterion for the category created in 310. For example, the criterion shown at 320*a*-320*c*. The criteria are not limited in scope but are shown as comprising three criteria for illustrative purposes. For example, the first criterion could be, Content Criteria: show_type=Movie && License Window End is in the next 30 days 320*a*. The next 320*b* criterion could be, for example: Sort Criteria: License Window End ascending and lastly 320*c*, another criterion could be: Maximum Number of Content Assets to include: 20. More criteria can be created, for example 320*a* . . . 320*n*.

Next at 330, the CCM, when invoked or run, will identify this category as in need of calculation. This means that the CCM will periodically run 340 and will use the category-based criteria in the CCM and compare it against the video catalog, for example, finding the category and updating the category according to the category-based criteria 320*a* . . . 320*c*.

Therefore, at 350 factoring in the Sort Criteria obtains a list of the first, for example, the first 20 Content Assets meeting the Content Criteria. Next, at 360 any content no longer in the list is removed. This means that any content not meeting the rules will be removed from the category. At 370, any content that now meets the rule and isn't included in the list is added to the category.

Finally, at 380, as in this example, the VCM, using the output from the CCM, will push the category information and relevant associations comprising the category associations, disassociations, and other category-related updates to the downstream storefront 200 where the categories are updated and presented to the end user.

Figure 4:
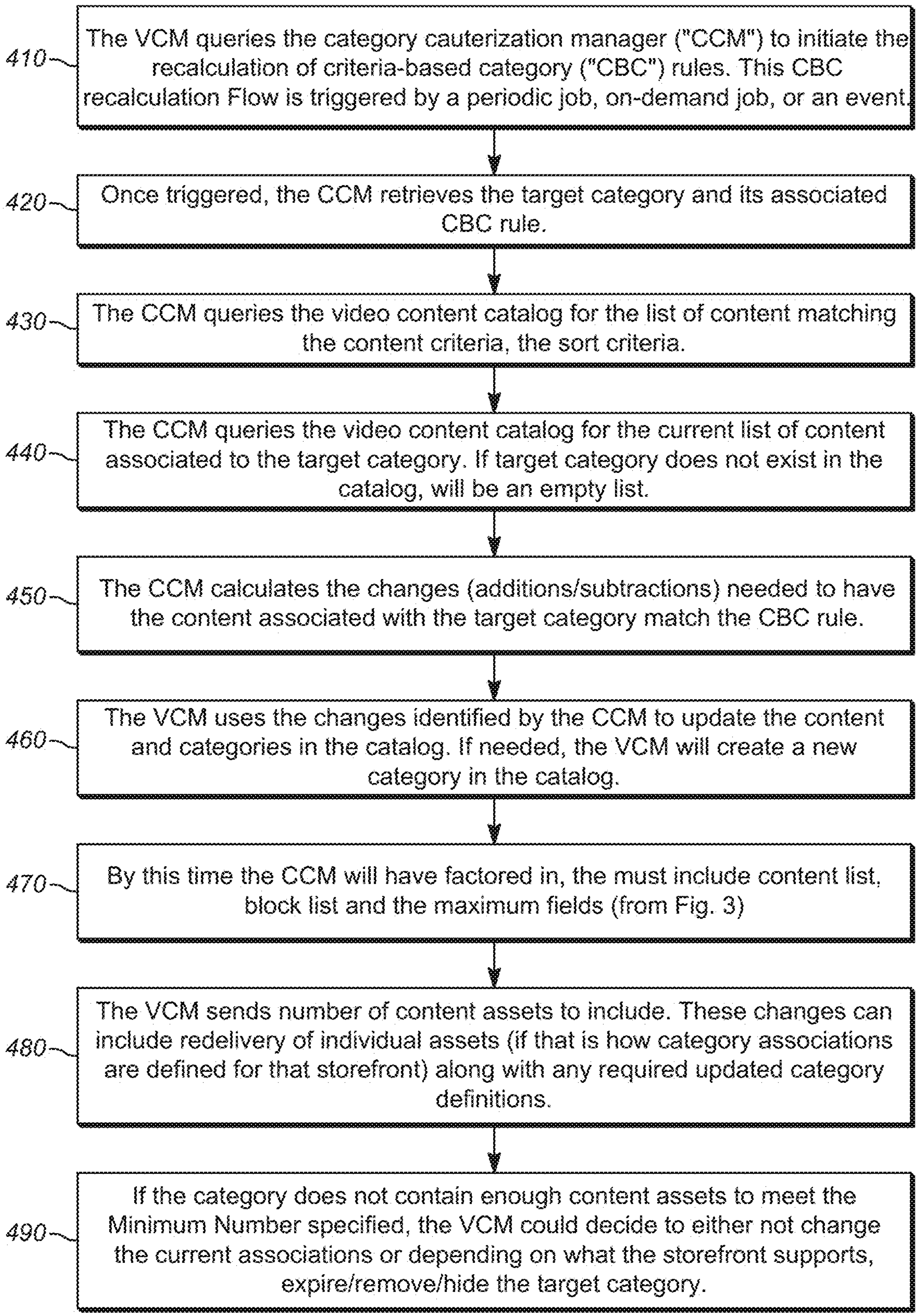
FIG. 4 is an example flow for Criteria Based Category ("CBC") recalculation.

In another example instance, a criteria-based category recalculation flow can be triggered by a periodic job. Once the initial categories are determined and titles assigned to the categories, an operator can continue to define criteria-based categories and could alter the original title or content assignments to those categories. In addition, other factors can change which titles would meet the criteria for association with a category. For example, critic reviews or user reviews can affect a popularity rating for a show. An increase or decrease in promotion or advertising could affect which titles might meet certain criteria. Other factors that may influence the same are social media, membership in some viewership subscriptions, and the like. In these cases, a video content manager may query the CCM to recalculate the criteria-based rules. The ability of the CCM to effect a dynamic quality to a storefront that would otherwise be static is a novel feature of the embodiments described herein. FIG. 4 illustrates this aforementioned recalculation.

Moving now to FIG. 4, an example criteria-based category ("CBC") recalculation is shown. Once the storefront 200 is populated and available to viewers, the CCM allows dynamic updates to the categories. The criteria-based category ("CBC") recalculation flow 400 is triggered by a periodic/on demand job or event at 410, for example, the VCM queries the CCM to recalculate the CBC rules.

At 420 The CCM then retrieves the target category and its associated CBC rule. Next, at 430 and referring to the criteria used in the previous example, the CCM queries the catalog for the list of content matching the content criteria, the sort criteria.

Advancing to 440, the CCM queries the catalog for the current list of content associated to the target category. If the Target Category does not exist in the catalog, this will be an empty list.

Next, at 450 the CCM calculates the changes (additions/subtractions) needed to have the content associated with the target category match the CBC rule. By this time, at 460, the CCM can have factored in some of the other fields such as the Must Include Content List, Block List, and the Maximum Number of Content Assets to include.

At 470 the VCM uses the changes identified by the CCM to update the content and categories in the catalog. If needed, the VCM will create a new category in the catalog.

Finally, at 480 the VCM sends the changes to the storefront 200. These changes can include redelivery of individual assets (if that is how category associations are defined for that storefront) along with any required updated category definitions. However, at 490, if the category does not contain enough Content Assets to meet the minimum number of titles specified, the VCM could decide to either not change the current associations or depending on what the storefront supports, expire/remove/hide the Target category.

As an additional note, CBC rules can be added, deleted, or updated based on business operator needs. The next time the CCM evaluates the rule it will base its calculation on the current definition of that particular CBC rule.

CBC rules can be redefined and added by the operator. Additional examples of CBC rules are listed below and can be exemplified by substituting these criteria into the flow in FIG. 3.

Example CBC Rule for English Language New Releases

Target Category: English Language New Releases

Content Criteria: license start date<1 month old

Example CBC Rule for English Language Old Movies

Target Category: English Language Old movies

Content Criteria: show_type=Movie && language=English && license start date<2010

Example CBC Rule for English Language Action Movies to Watch

Target Category: English Language Movies to watch

Content Criteria: score>4 && Genre==Action [for example, Score is taken from a third-party review site.

Figure 5:
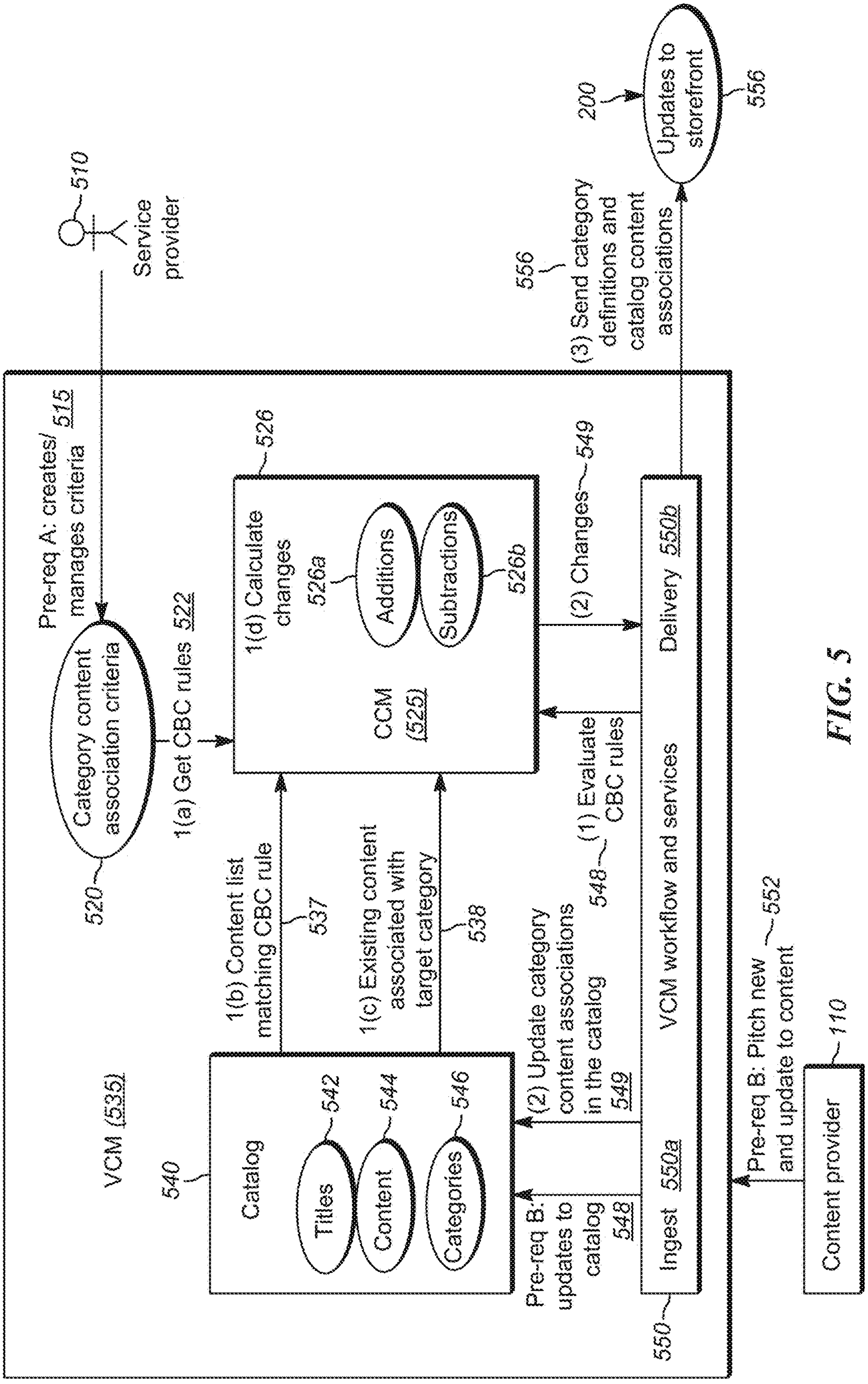
FIG. 5 shows components for inner workings for CCM.

Referring now to FIG. 5, a Content Management System comprises a video content manager ("VCM") 535. The VCM 535 comprises a content catalog 540, a content categorization manager ("CCM") 525, video workflow and services 550, and a storefront 200 (not shown). Content providers 110 and service providers 510 can determine, update, and change the metadata driving the preferences and positions in the storefront 200 (not shown), such that system and the flow associated therewith is both an initial categorization and dynamic, thereby using the inputs received from the system to facilitate automatic updates to the storefront.

As previously mentioned, both content providers 110 and service providers 510 can determine, update, and change the metadata driving the preferences and positions regarding content in the storefront 200. If the service provider 510 decides the categories in which the content can be placed, the service provider can specify category content association criteria 520. This criterion, also referred to as the Criteria Based Category ("CBC") rules 522, can be predefined 515 by the service provider 510. Once the service provider 510 decides in which categories the content should be placed (using the CBC Rules), the content can be manually placed, or in some cases, the placement can be left up to the storefront to dynamically determine placement. However, not all storefronts support this type of dynamic category placement and may require service providers 510 to manually assign content to categories. In situations where the service provider manually assigns content to categories, it can be a time-consuming process that can limit the number of categories that can be curated. Such a manual process can also take time from other activities.

The VCM Catalog 540 is initially populated with Content Assets 544 and categories 546. Each content asset has metadata 172 (not shown) associated to it that includes certain information, comprising a license window, genres, actors, and metadata from third party enrichment sources, as well other information that describes asset characteristics.

Updates from content provider 110, comprising new content and updates to content are provided 552 to the VCM Workflow and Services 550 where the content and any updates are ingested **550*a* and updates are then provided 548 from the VCM Workflow and Services 550 to the Catalog 540. These Content Assets may or may not have associations to categories. Additionally, the CBC Rules 520** may refer to existing categories or new categories.

Assuming the above-mentioned criteria are predefined, the CCM then allows an operator to define and refine and update categories and criteria. The CBC recalculation flow can be triggered by a periodic job or on demand. Once triggered, the VCM Workflow and Services 550 queries the CCM 530 to re-evaluate the CBC rules 520. The CCM retrieves the Target Category and its associate CBC rule 520 from the criteria. The CCM queries 537 the existing content in the Catalog 540 for current lists and content 542, 544, and 546 that match the CBC rule 537 along with other criteria, including any operator-defined criteria. The CCM 525 also queries 538 the Catalog 540 for the current list of content associated to the Target Category. If the Target Category does not exist in the Catalog 540, the list will be empty.

The CCM 525 will calculate the changes 526, including additions 526*a* and subtractions 526*b* needed to align with the desired category and the CBC rule. The CCM will have considered the necessary criteria to consider. For example, in an embodiment, the CCM will have factored in the following from the category rule: "Must Include Content List," the "Block List," and the "Maximum Number" of Content Assets to include.

The CCM will provide 529 changes identified in the CCM to the VCM Workflow and Services 550 in order to update 549 the content and categories in the Catalog 540. The VCM Workflow and Services 550 can create a new category 549 in the Catalog 540 if necessary.

The VCM Workflow and Services 550*b* will then send 556 changes that include Category definitions and Category Content Associations. These changes can include re-delivery of individual assets, if that is how category associations are defined for that storefront, along with any required updated category definitions. The changes and updates 556 are sent to the storefront 200 (not shown). If the category does not contain enough Content Assets to meet the Minimum Number specified, the VCM can decide to either not change the current association, or depending on what the storefront is configured to support, can expire, remove, or hide the Target Category.

CBC rules 520 can be added, deleted, or updated by the operator based on business needs. The next time the CCM evaluates the rule, the CCM can base its calculation on the current definition for that CBC rule. The disclosed dynamic nature that a CCM provides to a storefront, as opposed to being in the storefront, comprises a truly novel feature of the system. Also novel, is that the CCM can provide this dynamic nature to more than one storefront.

Therefore, as the embodiments illustrate, the Content Categorization Manager ("CCM") 525 can solve the problem and decrease the limitations of updating content and categories on a static storefront, as described above, because it allows an operator to create criteria for a Category that defines what content should and should not be associated to a Criteria Based Category ("CBC"). If the storefront does not support this dynamic category placement, and the service provider 510 is required to manually assign content to categories, it can be a time-consuming process that limits the number of categories that can be curated as well as taking away time from other activities.

The CCM supports placement of content into categories that reside on the storefront. Content can be placed into categories by the content provider 110 or by the service provider 510. If content is placed into categories by the content provider, for example, the category placement may be relayed to the service provider through the metadata pitched with the content.

The CCM considers a set of rules that are considered for example, to look at a date and a genre, and associate a title with a genre and add it to a category. However, not only is an operator able to specify some criteria, but this also allows for the system to dynamically decide what goes into that category. The process results in a kind of life cycle management and maintenance of the category criteria and content. As a result, some content may fall in and fall out of that category, such as in the case of a new release.

In one example embodiment, content could be two or three or four weeks within a license window to view the content. In a static environment, that time is assigned to the new release category; however, over time the release will get aged out. In a CCM environment, the system is periodically evaluating to determine what meets a certain criterion and what doesn't meet a certain criterion. Once determined, content that doesn't meet the criteria will be appropriately adjusted, with content likely being pulled in and out of the category. And, then the system will push those categories with the appropriate adjustments to the downstream storefronts 200, resulting in a dynamic kind of product merchandiser of sorts. As distinguished from existing systems, the CCM can dynamically determine what is in the category—this update to the categories and the storefront can be done dynamically or on demand by the operator.

Figure 6:
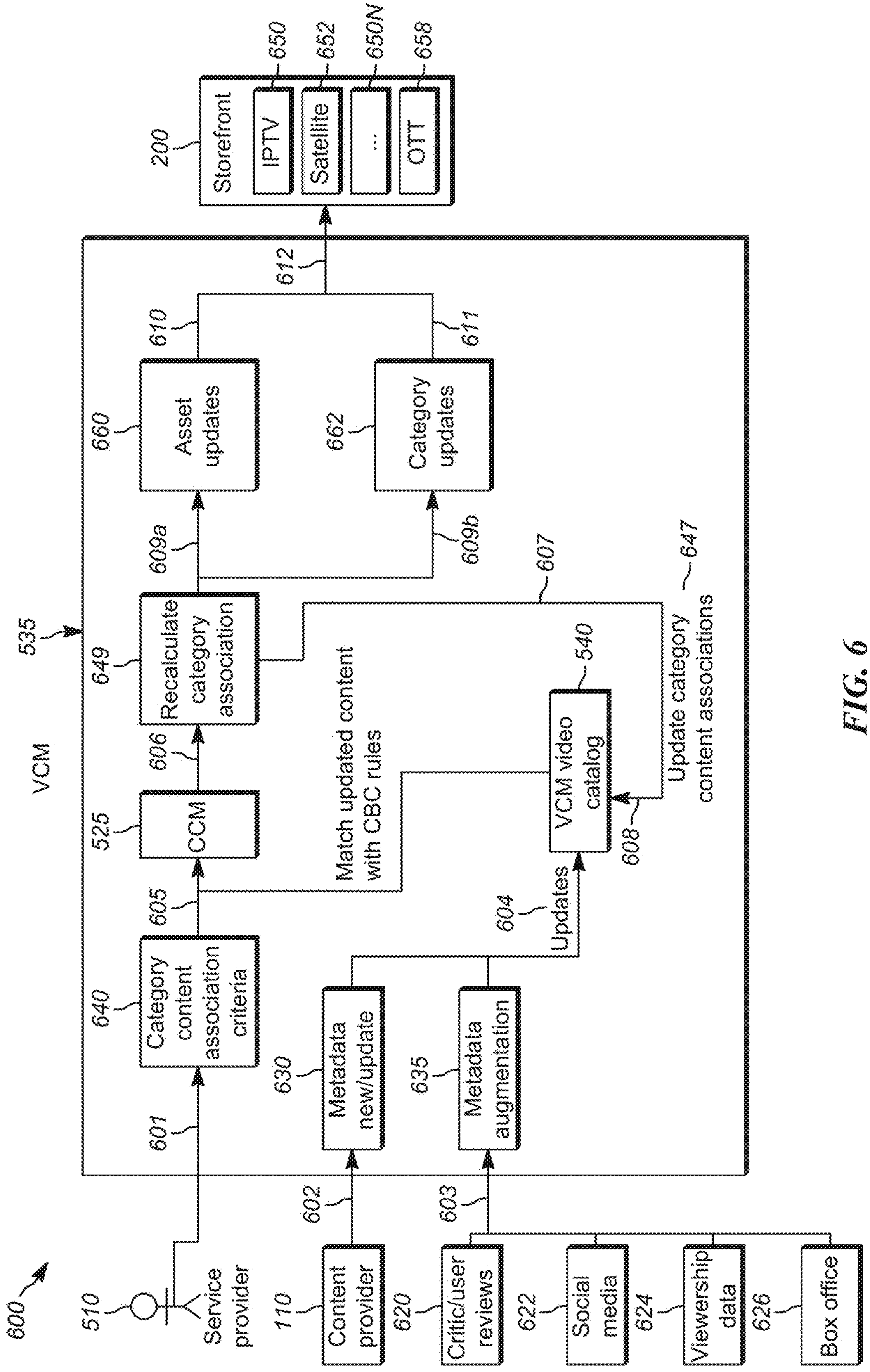
FIG. 6 illustrates an embodiment method for updates and changes to metadata and how they flow through a video content manager ("VCM").

FIG. 6 describes an embodiment method for updating and changing metadata via the system illustrated in FIG. 5 by adding the dynamic nature described herein to storefronts that are more static and that do not provide dynamic qualities.

The VCM 535 can receive inputs 601, 602, and 603 respectively from a service provider 510, a content provider 110, and other sources 620, 622, 624, and 626. Other sources of content, 620, 622, 624, and 626, can be outside of the control of the content provider and can change over time. However, the CCM leverages the category updates collected by the VCM to add a dynamic nature to any storefront that does not have capability or support to do this type of dynamic updating on its own.

The input 601 comprises category content association criteria 640 from the service provider 510. The resulting metadata will flow through the VCM 535 and used downstream.

A content provider 110 provides input 602 to the VCM, the input comprising metadata which can contain new or updated metadata 630. Additionally, the VCM receives input 603 from other sources. This input 603 can comprise, for example, critic reviews and user reviews 620, social media 622, viewership data 624, and box office data 626. Many other types of input can be provided. In this example, the input 603 from the other sources is received as augmented metadata 635. The data 635 and the data (metadata and new updates) 630 are combined as updates 604 and sent to the VCM video catalog 540. The data received in the VCM video catalog 540, along with the category content association criteria 640 from the service provider 510, is combined to match updated content with CBC rules with the resulting stream 605 and sent to the CCM 525.

The CCM sends combined input 606 to be updated by recalculating 649 the category association, based on this combined input. The recalculated category association data can then be sent on path 607 or 609. If appropriate, the data 607 can be sent to the VCM video catalog 540 and on to more updating. On this path, the output data from the recalculating category association 649 is advanced to available update Category Content Associations 647 and advanced to the VCM video catalog 540 where it then re-enters the cycle, moving through the VCM Video Catalog 540 and traveling on to the CCM 525 and reentering the flow.

Alternatively, the data output 609 can be advanced as 609*a* with asset updates 660 or advanced as 609*b* with category updates 662. The resulting output 610 and 611 is combined 612 and sent to a storefront 200. The storefront can comprise IPTV 650, Satellite 652, OTT 658, or any other number of outputs 650N that can be presented in a storefront 200 configuration.

FIG. 6 illustrates how several inputs can be taken together in deciding what should be placed in a category to help maximize value, create a unique and interesting group of titles that will entice a customer to explore and or purchase/view titles in the respective category.

As previously stated, some examples of content to the VCM comprise critic reviews and user reviews 620, social media 622, viewership data 624, and box office content 626. The sources of content 620, 622, 624, and 626 are outside the control of the content provider and can change over time.

The VCM collects information about the content, and the CCM leverages the information to add a dynamic nature to a storefront. The storefront, on its own, does not support this kind of dynamic quality. Utilizing the described system and method, the CCM can add this type of dynamic nature to more static storefront.

In an example, the foregoing illustrates how the contents of the 'Viewer Favorites' category can change over time. An abbreviated summary of the steps follows immediately below, with more detail given in FIGS. 7A and 7B.

On any day, for example for a basis of calculation, Feb. 2, 2023, a category is created based on the criteria specified by an operator. In this example, the Category='Viewer Favorites.'

Around, for example, a month later, on Mar. 1, 2023, the Category Content is updated to include a title that is now in a license window period. By license window, it is meant that the title or content is subject to a license to distribute the content, and the right to do so is now within the license window at the specified timing window.

At the example next day, Mar. 2, 2023, the change to the augmented metadata can in turn affect the content of the category.

This example illustrates how the contents of an example Category Criteria called 'Viewer Favorites' can change over time. The following paragraphs and FIGS. 7A, 7B, and 7C, continue the above example in greater detail. In doing so, consider the example Category Criteria field value to be:

Viewer Favorites: Viewer Score>=7.5

Referring back to the example observed first day, Feb. 2, 2023, the catalog in the VCM is as shown in FIG. 7A. The content assets in the catalog further comprises, a 'Title', the 'License Start Date', the 'License End date', 'Viewer Score', and 'Meets Category Criteria' fields.

Also on this specified date, the 'Viewer Favorites' category is created, and the Category Contents will be:

Movie 1
Movie 2

As shown, Movie 3 while meeting the Viewer Score, is not yet in license window so it is not included. Further, Movie 10 and Movie 11 are in their respective license windows, but they do not meet the Viewer Score criteria and are left out.

Advancing to the next observed date, March 1, the date the catalog in the VCM is as follows on FIG. 7B, which shows no changes from Feb. 2, 2023.

However, Movie 3 is now in its license window and is included in the Viewer Favorites Category. Movie 4 also in its license window but does not meet the Viewer Criteria, and it is not included in the category.

As on this specified date, the Viewer Favorites category and its Category Contents will be:

Movie 1
Movie 2
Movie 3

On the next observed date Mar. 2, 2023, the catalog in the VCM is as shown in FIG. 7C. The viewer score for Movie 3 has dropped below the 'Viewer Score' threshold, and the 'Viewer Score' for Movie 4 has risen and is above the 'Viewer Score' threshold. As a result, Movie 3 is removed, and Movie 4 is added. Therefore, on this observed date of Mar. 2, 2023, the 'Viewer Favorites' category and its Category Contents will be:

Movie 1
Movie 2
Movie 4

The update at the observed (second) Mar. 1, 2023, step can be handled in some capacity by some non-CCM storefronts. However, because the content can be associated to categories prior to its license window start, the content will not show up in the storefront until the license window start has passed. However, as described below, the change to the content at the Mar. 2, 2023 (third) example day, and similar content updates which are non-license-window-related, is the area of functionality that overcomes the static nature of categories on some of the legacy storefronts and highlight the novelty of the disclosed embodiments. The novelty lies with the changes and the augmented metadata that will update the CCM in the VCM appropriately and continually.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation to data processing apparatus. The tangible program carrier can be a propagated signal or a computer readable medium. The propagated signal is an artificially generated signal e.g., a machine generated electrical optical or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal or a combination of one or more of them.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analog circuit. Further, when a technology of making into an integrated circuit superseding integrated circuits at the present time appears due to advancement of a semiconductor technology, the integrated circuit by this technology is also able to be used.

The processes and logic flows described in this specification may be performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise," or a derivative thereof, when used in a claim, is used in a nonexclusive sense that is not intended to exclude the presence of other elements or steps in a claimed structure or method.

We claim:

1. A method for providing a plurality of content assets for delivery to a video delivery storefront, the method comprising:

receiving the content assets provided by a content provider, into a video content management system, each of said video contents comprising a video file and meta data containing information associated with said video file, the video content management system further comprising:

receiving the content assets into a video content management system workflow module, wherein the video content management system workflow module processes the content assets and sends the content assets to a video content catalog;

receiving into a content categorization manager, one or more criteria-based categories for organizing video assets, further receiving into the content categorization manager, one or more category content association criteria related to each of said one or more criteria-based categories for associating the content assets with each of said one or more criteria-based categories;

processing by the content categorization manager to generate for each of said one or more criteria-based categories a subset of said content assets based on said one or more category content association criteria and said meta data, wherein said subset of said content assets is less than all of said content assets;

receiving into the video content catalog, one or more periodic updates to the content assets, the updates provided by the one or more content providers;

receiving into the content categorization manager, one or more periodic updates to the category content association criteria;

receiving into the content categorization manager, one or more periodic updates to the criteria-based categories;

further processing by the content categorization manager, a request to dynamically refresh said subset of said content assets associated with one of said one or more criteria-based categories;

processing by the content categorization manager, a request to dynamically refresh the one or more content-based categories provided to the storefront; and sending the updated subset of content assets and the updated one or more content-based categories to the video storefront, wherein the refreshed content assets dynamically update the storefront based on operator-defined criteria; and wherein the updated respective subsets of said content assets for each of said one or more criteria-based categories comprise recalculated criteria-based categories based on updated category content association criteria for sending to the storefront by dynamically updating the defined criteria-based categories of content assets and providing the updated respective subsets of said content assets for each of said one or more criteria-based categories to the storefront.

2. The method of claim 1, wherein the periodic updates to the video content catalog from the content providers comprise new content assets as well as updates to existing content assets.

3. The method of claim 1, where the criteria-based categories and the category content association criteria are provided by an operator.

4. The method of claim 1, wherein the category content association criteria used to define what content assets are candidates to be associated to a criteria-based category can be either positive criteria or negative criteria.

5. The method of claim 1, wherein refreshing the video content catalog comprises interrogating the video content catalog and applying the category content association criteria to the content assets in the video content catalog to update the subset of content assets associated with the one or more criteria-based categories in the content categorization manager.

6. The method of claim 1, wherein the request to refresh the content assets associated with the criteria-based category is made via the video content management system workflow module and received by the content categorization manager.

7. The method of claim 1, wherein the request to update the content-based categories that are provided to the video storefront is made via the video content management system workflow module and received by the content categorization manager.

8. An apparatus for processing video files comprising:

a video content management system for dynamically determining video content placement within a storefront, the video content management system further comprising:

a video content management system workflow module operably interconnectable with one or more content providers, said video content management system workflow module receiving one or more content assets from said one or more content providers, each of said video contents comprising a video file and meta data containing information associated with said video file;

a video content catalog operably interconnected with said video content management system workflow module, said video content catalog storing the one or more content assets received from said video content management system workflow module;

a content categorization manager operably interconnected with said video content management system workflow module and interconnected with said video content catalog said content categorization manager receiving one or more target criteria-based categories for organizing video assets and category content association criteria associated with each of said one or more criteria-based categories; and a video-on-demand storefront utilizing one or more criteria-based categories to present content assets to one or more end users, the content categorization manager generating for each of said one or more criteria-based categories a subset of said content assets based on said one or more category content association criteria and said meta data, wherein said subset of said content assets is less than all of said content assets;

wherein the content categorization manager dynamically updates the criteria-based categories;

wherein the content categorization manager dynamically updates the subset of content assets associated with a criteria-based category based on said one or more category content association criteria and said meta data;

wherein the video content management system workflow module sends the updated criteria-based categories and their associated subset of content assets to the storefront; and wherein the updated respective subsets of said content assets for each of said one or more criteria-based categories comprise recalculated criteria-based categories based on updated category content association criteria for sending to the storefront by dynamically updating the defined criteria-based categories of content assets and providing the updated respective subsets of said content assets for each of said one or more criteria-based categories to the storefront.

9. The apparatus of claim 8, wherein the video catalog comprises titles, and categories.

10. The apparatus of claim 8, where the category categorization manager receives the one or more target criteria-based categories and category content association criteria associated with each of said one or more criteria-based categories from a service provider or operator.

11. The apparatus of claim 8, wherein the video content management system workflow module periodically requests the content categorization manager to query the video content catalog and update said respective subsets of said content assets for each of said one or more criteria-based categories.

12. The apparatus of claim 11, wherein the updated criteria-based categories are dynamically provided to the storefront.

13. The apparatus of claim 11, wherein the updates support dynamic recalculation of the subset of content assets placed within a storefront.

* * * * *